April 9, 1929.  C. W. GILLIAM, JR  1,708,266
DRINK MIXER
Filed Dec. 17, 1926   2 Sheets-Sheet 1

C. W. Gilliam Jr.
INVENTOR.
BY Paul S. Eaton
ATTORNEY.

Patented Apr. 9, 1929.

1,708,266

UNITED STATES PATENT OFFICE.

CHARLES W. GILLIAM, JR., OF RONDA, NORTH CAROLINA.

DRINK MIXER.

Application filed December 17, 1926. Serial No. 155,449.

My invention relates to drink mixers, and more especially to a drink mixer in which the drink is stirred in a more effective manner than has been heretofore accomplished.

An object of my invention is to provide a drink mixer in which the liquid is first stirred at the bottom, and then gradually stirred nearer the top of the liquid, and by finishing up the stirring operation at the top of the liquid, thus producing a better mixture of the ingredients of the drink.

Another object of my invention is to provide a drink mixer which will automatically operate when a container partially filled with liquid is placed in the same, and which will automatically cease to operate when the liquid in the container shall have been properly mixed and stirred.

Another object of my invention is to provide a drink mixer in which a container holding a liquid, is placed in the mixer in an elevated position, and which container will gradually lower as the mixing operation progresses, and when the container reaches its lowest position the mixing operation will have been completed and the mixer will automatically cease to operate.

In the drawings I have shown a preferred embodiment of my invention, in which—

Figure 1:
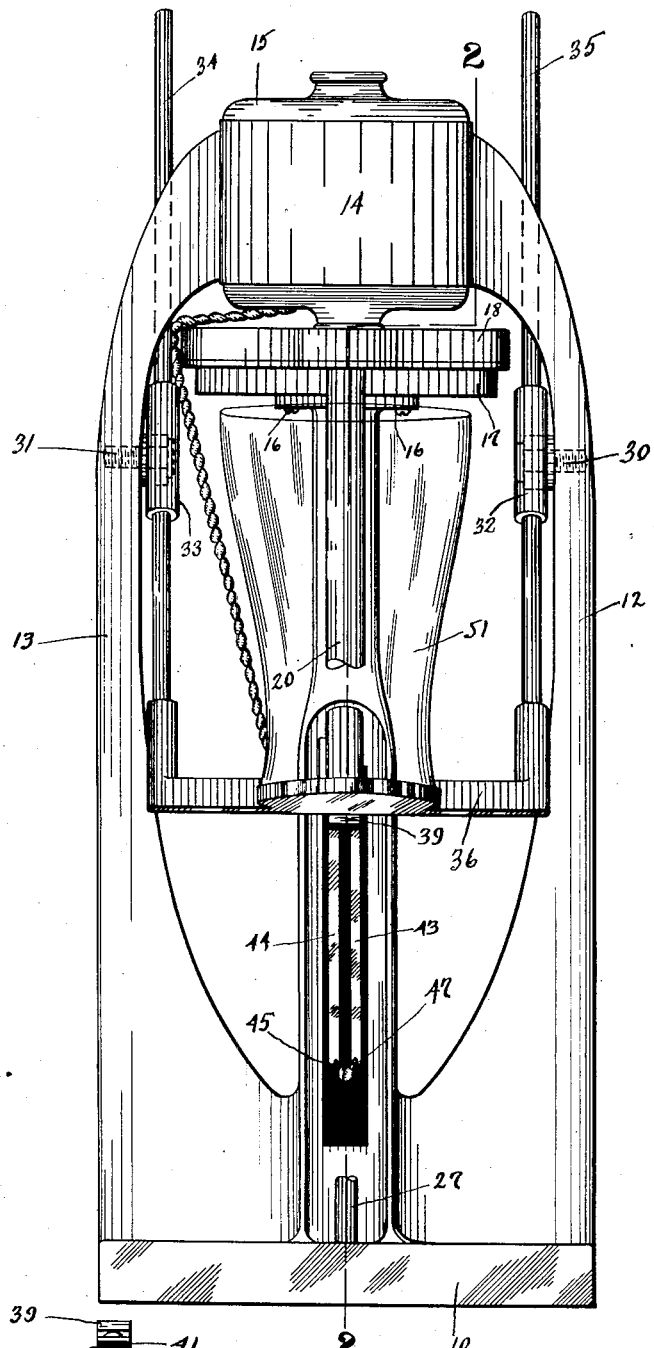
Figure 1 is a front elevation of my device.
Figure 3:
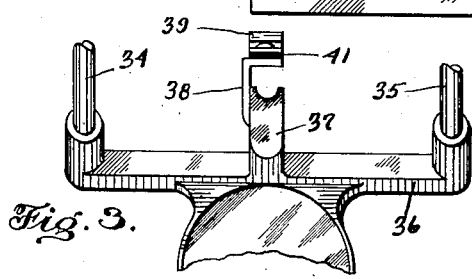
Figure 3 is a detail view of the lowering means.
Figure 2:
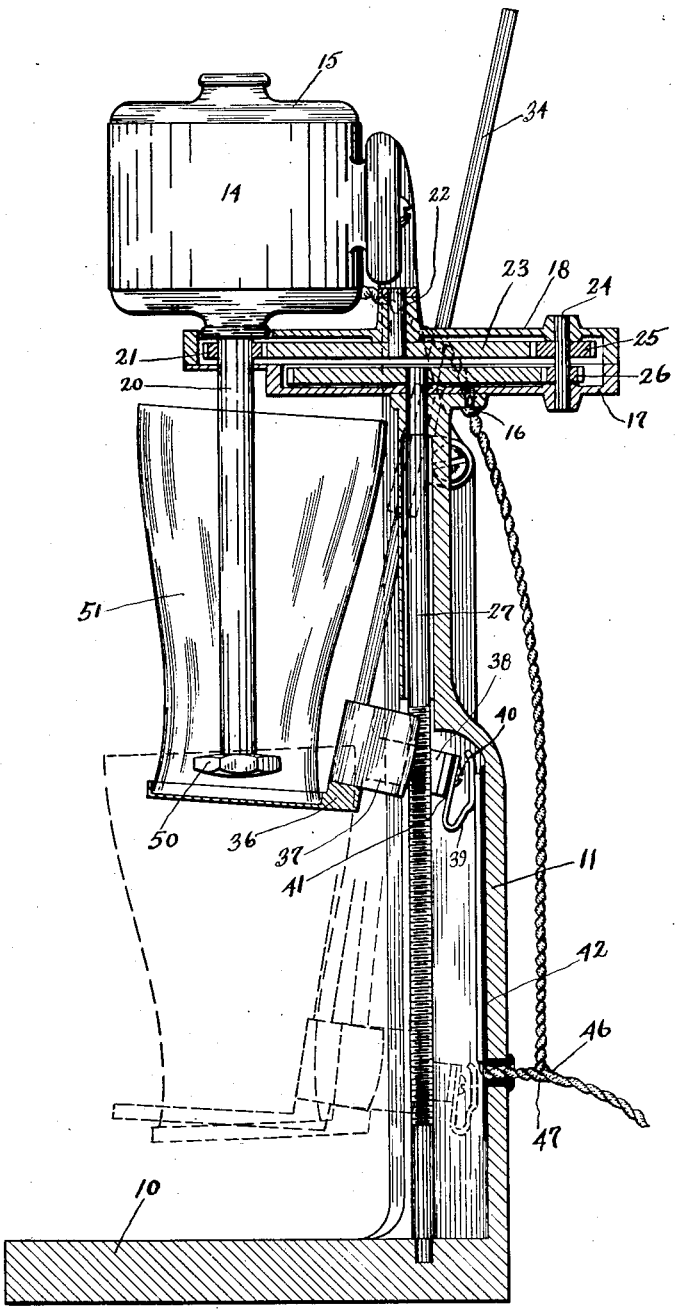
Figure 2 is a sectional view of my device; taken along the line 2—2 in Figure 1.

Referring more particularly to the drawings, there is provided the base portion 10, which has the upstanding portion 11, which projects upwardly from the back central portion of the said base member, and on each side of the base portion there are the upstanding members 12 and 13, said portions 12 and 13 terminating in a ring-shaped portion 14 at their upper ends, in which the electric motor 15 is adapted to be mounted.

Secured to the top of the portion 11, by means of the screw 16, is a gear casing composed of the members 17 and 18, the portion 18 fitting against the base of the ring-shaped member 15. These casing portions have holes therethrough, through which the extension shaft 20 from the motor projects. Secured to the shaft 20 is the gear wheel 21, and rotatably mounted in the casing member 18 is the shaft 22, to which is fixedly secured the larger gear wheel 23. Rotatably mounted in the casing portions 17 and 18, is the shaft 24, on which shaft the gear wheels 25 and 26 are fixedly secured. Rotatably mounted in the base portion 10 and the upper end of the upright 11, is the threaded shaft 27, which has the gear wheel 28 fixedly secured to its upper end. The gear wheels 21, 23, 25, 26 and 28 mesh with each other to form a train of gears, so that when the motor 15 is energized the gear 21 will drive the gear 23, which will drive the gear 25, which in turn will drive the gear 26, which gear 26 being in mesh with the gear 28, will cause the same to rotate with its shaft 27.

Pivotally mounted on the bolts 30 and 31, are the tubular members 32 and 33, which are adapted to slidably receive the rods 34 and 35, the lower ends of said rods being secured to the container supporting member 36. Projecting backward from the supporting member 36, is the threaded portion 37, whose threads are adapted to engage the threads on the shaft 27 when it is desired to operate the device for mixing drinks and other mixtures. The projection 37 has an extension 38 on which is mounted the spring contact member 39, by means of a screw 40, the spring contact member being insulated from the extension 38 by means of insulating material 41.

Secured to the forward face of the upstanding portion 11 is the insulating member 42, which has secured thereto the conducting members 43 and 44, which are made of copper or other suitable material. A wire 45 is connected to the member 44, which wire is connected to the electric motor, and the return wire 46 runs from the other side of the motor to the source of current (not shown). A wire 47 runs from the member 43 to the other pole of the source of current.

The shaft 20 projects downwardly and has suitable agitating means, such as indicated at 50, which shaft and agitating means are adapted to project downwardly into the container, such as a glass 51, as is commonly used at drinking fountains.

The method of operation of my device is as follows:

The support 36 and associated parts are placed in the position shown in full lines in Figure 1, with the contact point 39 pressing against the strips 43 and 44, and held in position by the weight of the parts and the contents of the glass container 51. This contact member 39 will be in contact with both of the strips 43 and 44, and will complete a circuit through the motor 15, which will cause it to rotate, and through the train of gears described, the shaft 27 will rotate at a much lower speed than the motor shaft 20, and the threaded portion 37 being in engagement with the threaded shaft 27 will cause the support and the container to gradually lower until they reach the position shown in dotted lines in Figure 1, at which point the circuit will be broken and the motor will cease to operate, and the container will cease its downward travel.

It is thus seen that the drink or mixture will be stirred at the bottom first, and gradually the stirring operation will be carried on closer to the surface of the liquid contained in the container, and the last of the stirring operation will take place near and at the surface of the liquid, and a foamy effect will be given to mixtures, such as milk shakes, which is very desirable.

By means of my arrangement, and by proper arrangement of the train of gears, the mixture will be given the proper amount of stirring, and when such proper amount of stirring has been done, the device will automatically stop. This will also enable the clerk to attend to other business, and will not compel his attention and judgment to be exercised as to the proper amount of stirring to be given to the drink which is being mixed.

In the description and drawings I have set forth a preferred embodiment of my invention, and although specific terms are employed, they are used in a generic and descriptive sense only, and not for purposes of limitation, the scope of the invention being set forth in the appended claims.

I claim:

1. In an agitating device, an agitator, agitating means, a container in which said agitator is adapted to operate, and means cooperating with the agitating means for gradually and forcibly lowering the container while the agitator is operating, and means for automatically stopping said lowering and agitating operations.

2. In a mixer for liquids and the like, a vertically slidable support adapted to support a container, an agitator adapted to operate in the container, coacting means for driving the agitator and for forcibly lowering the support and container relative to the agitator while the agitator is operating, and means for automatically stopping the agitator and lowering means.

3. In an agitating device, a motor driven agitator, a container adapted to hold liquids while the same are being agitated by the agitator, means for holding the container, positive means driven by the said motor for lowering the container and container holding means while the agitator is in operation, and automatic means for simultaneously starting and simultaneously stopping both the agitator and the lowering means.

4. In a drink mixer, a framework, a motor mounted in the upper portion of the framework, a vertically disposed agitator connected to the said motor, a vertically disposed threaded rod having a geared connection with the motor, a container holding device pivoted in the upper portion of the frame, a container for drinks adapted to be supported by the container holding device, a threaded portion secured to the container holding device, said threaded portion being adapted to engage the threaded rod when a filled container is placed in the container holding device and to progressively lower the container while the agitator is in operation, and a switch mechanism adapted to start the motor when the filled container is placed in the container holding device and to stop the motor when the container holding device has reached its lowermost position.

5. In a liquid mixing device, a framework, an electric motor mounted in the framework, an agitator projecting downwardly from the motor and being driven thereby, a vertically disposed threaded rod adapted to be driven by the said motor, a container support pivotally and slidably mounted in the framework and having a threaded portion thereon adapted to engage the threads on the threaded rod when a container is placed on the support and to be moved downwardly by the rotation of the rod, a switch on the container support adapted to slidably engage a stationary switch in the framework, the wiring for the motor being controlled by the switch to thus effect simultaneous stopping of the agitator and the lowering means.

6. A drink mixer having a motor driven agitator, a support for the drink container, threaded means driven by the motor for lowering the support, and means controlled by the support for simultaneously stopping the motor, the agitator and the downward travel of the support.

In testimony whereof I affix my signature.

CHARLES W. GILLIAM, Jr.